United States Patent
Akiyama

(10) Patent No.: US 11,494,922 B2
(45) Date of Patent: Nov. 8, 2022

(54) OBJECT TRACKING DEVICE, OBJECT TRACKING METHOD, AND OBJECT TRACKING PROGRAM

(71) Applicant: NEC CORPORATION, Tokyo (JP)

(72) Inventor: Tatsuo Akiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 76 days.

(21) Appl. No.: 16/980,531

(22) PCT Filed: Mar. 23, 2018

(86) PCT No.: PCT/JP2018/011705
§ 371 (c)(1),
(2) Date: Sep. 14, 2020

(87) PCT Pub. No.: WO2019/180917
PCT Pub. Date: Sep. 26, 2019

(65) Prior Publication Data
US 2021/0004967 A1     Jan. 7, 2021

(51) Int. Cl.
*G06T 7/246*     (2017.01)
*G06T 7/73*     (2017.01)
*G06V 10/75*     (2022.01)

(52) U.S. Cl.
CPC ................ *G06T 7/248* (2017.01); *G06T 7/74* (2017.01); *G06V 10/751* (2022.01); *G06T 2207/10016* (2013.01); *G06T 2207/30196* (2013.01)

(58) Field of Classification Search
CPC . G06T 2207/10016; G06T 2207/30196; G06T 7/248; G06T 7/74; G06V 10/751; G06V 20/52
See application file for complete search history.

(56) References Cited

U.S. PATENT DOCUMENTS 10,755,421 B2 *   8/2020   Hasejima ................ G06T 7/292
10,925,579 B2 *   2/2021   Zhang ..................... G16H 50/30
(Continued)

FOREIGN PATENT DOCUMENTS

CN     108053427 A *   5/2018 ............. G06T 7/248
JP     2010-072723 A    4/2010
(Continued)

OTHER PUBLICATIONS

Shaoqing Ren et al., "Faster R-CNN: Towards Real-Time Object Detection with Region Proposal Network", ArXiv, https://arxiv.org/abs/1506.01497, Jan. 6, 2016 14pages.
(Continued)

*Primary Examiner* — Ian L Lemieux
(74) *Attorney, Agent, or Firm* — Sughrue Mion, PLLC

(57) ABSTRACT

An object tracking device includes an image buffer configured to store a plurality of images included in a video, a detection part configured to detect an object position by executing a detection process with respect to an object reflected in the plurality of images, a tracking part configured to execute a tracking process with respect to a tracking-image string representing a scope of images ranging from an image producing an object-detection result and an image producing a next object-detection process, and an integration part configured to calculate an integrative object position by integrating a detection result and a tracking result. Herein, the scope of images is determined based on an execution timing or a termination timing of the detection process, thus executing the detection process and the tracking process in parallel.

10 Claims, 15 Drawing Sheets

(56) References Cited

U.S. PATENT DOCUMENTS

| | | | |
|---|---|---|---|
| 11,074,695 B2* | 7/2021 | Iwamatsu | G06T 7/20 |
| 2009/0304234 A1* | 12/2009 | Kondo | G06T 7/248 |
| | | | 382/103 |
| 2011/0058708 A1* | 3/2011 | Ikenoue | G06T 7/251 |
| | | | 382/103 |
| 2011/0286631 A1* | 11/2011 | Wagner | G06V 10/24 |
| | | | 382/103 |
| 2012/0148102 A1* | 6/2012 | Moriguchi | G06T 7/277 |
| | | | 382/103 |
| 2014/0146182 A1* | 5/2014 | Endo | H04N 5/232123 |
| | | | 348/169 |
| 2016/0350938 A1* | 12/2016 | Maltese | G06T 7/277 |
| 2018/0173963 A1* | 6/2018 | Taylor | G06T 3/00 |
| 2018/0254065 A1* | 9/2018 | Chen | G06T 7/254 |
| 2018/0342068 A1* | 11/2018 | Hasejima | G06T 7/277 |
| 2019/0065895 A1* | 2/2019 | Wang | G06V 40/161 |
| 2019/0156491 A1 | 5/2019 | Akiyama | |
| 2020/0175693 A1* | 6/2020 | Takada | G06V 10/50 |

FOREIGN PATENT DOCUMENTS

| | | |
|---|---|---|
| JP | 2015-194901 A | 11/2015 |
| JP | 2016-162232 A | 9/2016 |
| WO | 2013/128839 A1 | 9/2013 |
| WO | 2016/144431 A1 | 9/2016 |
| WO | 2017/199840 A1 | 11/2017 |

OTHER PUBLICATIONS

Joseph Redmon et al., "YOLO9000: Better, Faster, Stronger", ArXiv, https://arxiv.org/abs/1612.08242, pp. 7263-7271. Dec. 26, 2016.

Wei Liu et al., "SSD: Single Shot MultiBox Detector", ArXiv, https://arxiv.org/abs/1512.02325, 17pages. Dec. 29, 2016.

Sam Hare et al., "Struck: Structured Output Tracking with Kernels", IEEE Transactions on Pattern Analysis and Machine Intelligence, 2016, 8 pages, vol. 28, Issue 10. Oct. 1, 2016.

Eldar Insafutdinov et al., "ArtTrack: Articulated Multi-person Tracking in the Wild", ArXiv, https://arxiv.org/abs/1612.01465, pp. 6457-6465. May 9, 2017.

International Search Report for PCT/JP2018/011705 dated Jun. 19, 2018 [PCT/ISA/210].

Joseph Redmon et al., "YOLO9000: Better, Faster, Stronger", ArXiv, https://arxiv.org/abs/1612.08242, pp. 7263-7271.

Wei Liu et al., "SSD: Single Shot MultiBox Detector", ArXiv, https://arxiv.org/abs/1512.02325, 17pages.

Sam Hare et al., "Struck: Structured Output Tracking with Kernels", IEEE Transactions on Pattern Analysis and Machine Intelligence, 2016, 8 pages, vol. 28, Issue 10.

Eldar Insafutdinov et al., "ArtTrack: Articulated Multi-person Tracking in the Wild", ArXiv, https://arxiv.org/abs/1612.01465, pp. 6457-6465.

Japanese Notice of Allowance for JP Application No. 2020-507247 dated Aug. 10, 2021 with English Translation.

\* cited by examiner

OBJECT TRACKING DEVICE, OBJECT TRACKING METHOD, AND OBJECT TRACKING PROGRAM

CROSS REFERENCE TO RELATED APPLICATIONS

This application is a National Stage of International Application No. PCT/JP2018/011705 filed Mar. 23, 2018.

TECHNICAL FIELD

The present invention relates to an object tracking device, an object tracking method, and an object tracking program.

BACKGROUND ART

Recently, technologies for tracking and detecting objects such as specific persons and articles from videos captured by surveillance cameras or the like have been developed. Patent Document 1 discloses a tracking device and a tracking system. The tracking device includes a high-precision tracking means, a high-speed tracking means, a correction means, and a means for specifying tracking objects. When a tracking result at a past instant of time, which is produced by the high-precision tracking means with a delay, differs from a tracking result at a past instant of time produced by the high-speed tracking means by a predetermined difference or more, the correction means may correct the tracking result of the high-speed tracking means with the tracking result of the high-precision tracking means, thus carrying out a tracking process again until a present time. Patent Document 1 teaches parallel processing of the high-precision tracking means and the high-speed tracking means.

Patent Document 2 discloses a high-precision image recognition device configured to track and detect persons or objects from videos captured by cameras. Herein, this technology is designed to detect objects based on a likelihood as to objects to be included in each of partial areas of focused images in moving images, and therefore the detected positions of objects will be output and integrated with the tracking positions of objects.

Patent Document 3 discloses an object tracking device configured to properly track objects irrespective of mutual occlusion occurring between multiple objects in moving images captured by cameras. In particular, this technology may manage multiple objects mutually overlapping each other in units of container (i.e. a set of objects associated with each other in frames) in order to track objects with a high precision irrespective of overlap between objects when multiple objects (persons) are moving individually. Specifically, a container is produced at a time causing overlap between multiple objects being tracked independently, and then objects are released from the container at a time of releasing overlap between objects.

Various methods have been developed to detect objects in images captured by cameras. For example, it is possible to detect objects by holding images of objects to be detected in images as templates in advance and then operating templates on images (e.g. sliding windows). As methods to detect objects in images, it is possible to mention Non-Patent Literature Documents 1-3. Those Non-Patent Literature Documents disclose technologies of determining types of objects and areas locating objects by prior learning of neural networks.

Non-Patent Literature Document 1 discloses a real-time object detecting method using Faster R-CNN (Regional-based Convolutional Neural Network). Non-Patent Literature Document 2 discloses a real-time object detecting system called YOLO (You Only Look Once) 9000. According to YOLO 9000, it is possible to detect 9,000 or more object categories (or object classes). Non-Patent Literature Document 3 discloses an SSD (Single Shot Detector) as an object detecting method using a single deep neural network.

As methods of tracking objects in images, it is possible to mention Non-Patent Literature Documents 4, 5. Non-Patent Literature Document 4 discloses a technology of tracking objects with a high precision irrespective of changing in appearance of objects in videos by successively learning object-area images using an object detection/tracking method (Kernelized Structure Output Support Vector Machine) with respect to visual object tracking in human-computer interactions, surveillance, and augmented reality. Herein, it is possible to track objects at relatively high speed using a scheme called Budget Maintenance to manage the number of support vectors.

Non-Patent Literature Document 5 discloses an object tracking method called ArtTrack (Articulated Multi-person Tracking), i.e. a technology for tracking objects with a high precision irrespective of partial occlusion occurring in objects relating to persons. Specifically, this technology is designed to detects parts constituting objects and to thereby integrating parts using a spatiotemporal model.

CITATION LIST

Patent Document

Patent Document 1: Japanese Patent Application Publication No. 2015-194901
Patent Document 2: Japanese Patent Application Publication No. 2016-162232
Patent Document 3: International Publication No. WO 2017/199840

Non-Patent Literature Document

Non-Patent Literature Document 1: Shaoquing Ren et al., "Faster R-CNN: Towards Real-Time Object Detection with Regional Proposal Networks", ArXiv, https://arxiv.org/abs/1506.01497
Non-Patent Literature Document 2: Joseph Redmon et al., "YOLO9000: Better, Faster, Stronger", ArXiv, https://arxiv.org/abs/1612.08242
Non-Patent Literature Document 3: Wei Liu et al., "SSD: Single short MultiBox Detetor", ArXiv, https://arxiv.org/abs/1512.02325
Non-Patent Literature Document 4: Sam Hare et al., "Struck: Structured Output Tracking with Kernels", IEEE Transactions on Pattern Analysis and Machine Intelligence, Volume 38, Issue: 10, 2016
Non-Patent Literature Document 5: Eldar Insafutdinov et al., "ArtTrack: Articulated Multi-person Tracking in the Wild", ArXiv, https://arxiv.org/abs/1612.01465

SUMMARY OF INVENTION

Technical Problem

The aforementioned conventional technologies (e.g. patent documents and non-patent literature documents) may need to track and detect feature points of objects in a wide range of videos, therefore those technologies may suffer from drawbacks of insufficiency in detection processes and tracking processes of objects.

The present invention aims to provide an object tracking device, an object tracking method, and an object tracking program which can solve the aforementioned problem.

Solution to Problem

A first aspect of the present invention relates to an object tracking device including an image buffer configured to store a plurality of images included in a video, a detection part configured to detect an object position by executing a detection process with respect to an object reflected in a plurality of images; a tracking part configured to track the object among a plurality of images by executing a tracking process based on the detection result of the detection process, an integration part configured to calculate an integrative object position by integrating the detection result of the detection process and the tracking result of the tracking process, and a control part configured to execute the detection process and the tracking process in parallel upon determining a scope of images in the video based on an execution timing or a termination timing of the detection process.

A second aspect of the present invention relates to an object tracking method including the steps of: detecting an object position by executing a detection process with respect to an object reflected in a plurality of images included in a video; tracking the object among a plurality of images by executing a tracking process based on the detection result of the detection process; calculating an integrative object position upon integrating the detection result of the detection process and the tracking result of the tracking process; and determining a scope of images in the video based on an execution timing or a termination timing of the detection process, thus executing the detection process and the tracking process in parallel.

A third aspect of the present invention relates to an object tracking program including the steps of: detecting an object position by executing a detection process with respect to an object reflected in a plurality of images included in a video; tracking the object among a plurality of images by executing a tracking process based on the detection result of the detection process; calculating an integrative object position upon integrating the detection result of the detection process and the tracking result of the tracking process; and determining a scope of images in the video based on an execution timing or a termination timing of the detection process, thus executing the detection process and the tracking process in parallel.

Advantageous Effects of Invention

An object tracking device and an object tracking method according to the present invention are designed to execute an object-detection process and an object-tracking process in parallel, and therefore it is possible to track and detect objects with high calculation efficiency and with a high precision.

DESCRIPTION OF EMBODIMENTS

An object tracking device and an object tracking method according to the present invention will be described in detail by way of working examples with reference to the accompanying drawings.

Figure 16:
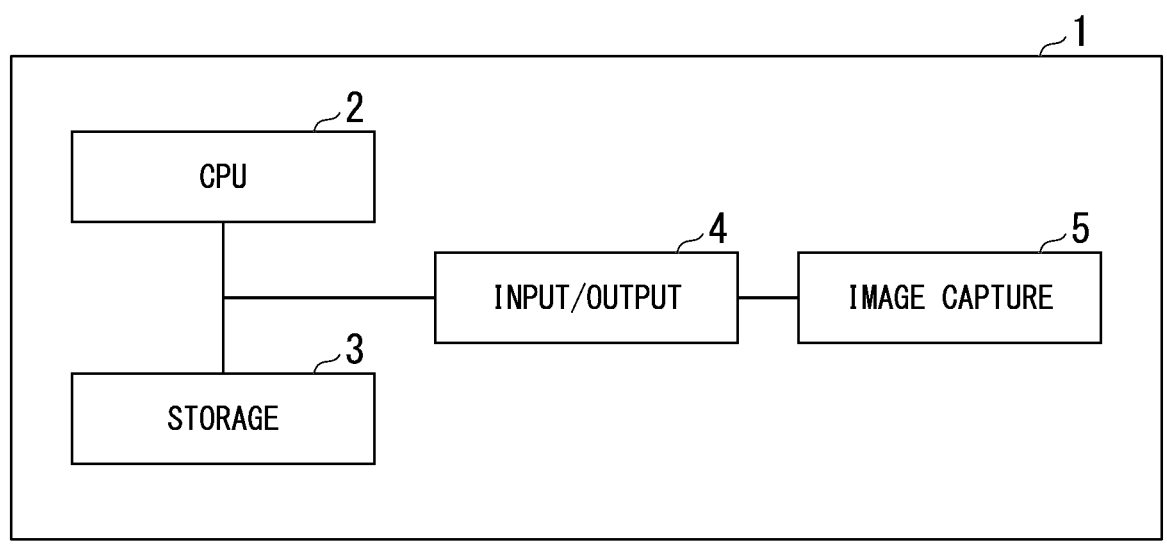
FIG. 16 is a block diagram showing the configuration of a generally-known computer device configured to implement the present invention.

FIG. 16 shows the configuration of a generally-known computer device used to implement the present invention, wherein an object tracking process can be implemented using software operating on a computer. FIG. 16 shows an object tracking device 1 having the hardware configuration including a processor operable under the control of programs (e.g. a CPU 2), a storage 3 configured to store software programs and data required for an object tracking process, an input/output part 4 configured to input/output data and calculation results, and an image-capture part 5 configured to capture videos. In this connection, the object tracking device 1 should include at least one of the input/output part 4 and the image-capture part 5. For example, the object tracking device 1 may solely include the input/output part 4 configured to input/output videos stored in an external storage device. Alternatively, the input/output part 4 may input videos captured by the image-capture part 5 configured of a generally-known camera.

First Embodiment

The configuration and the operation of an object tracking device 100 according to the first embodiment of the present invention will be described in detail with reference to FIGS. 1 to 8.

Figure 1:
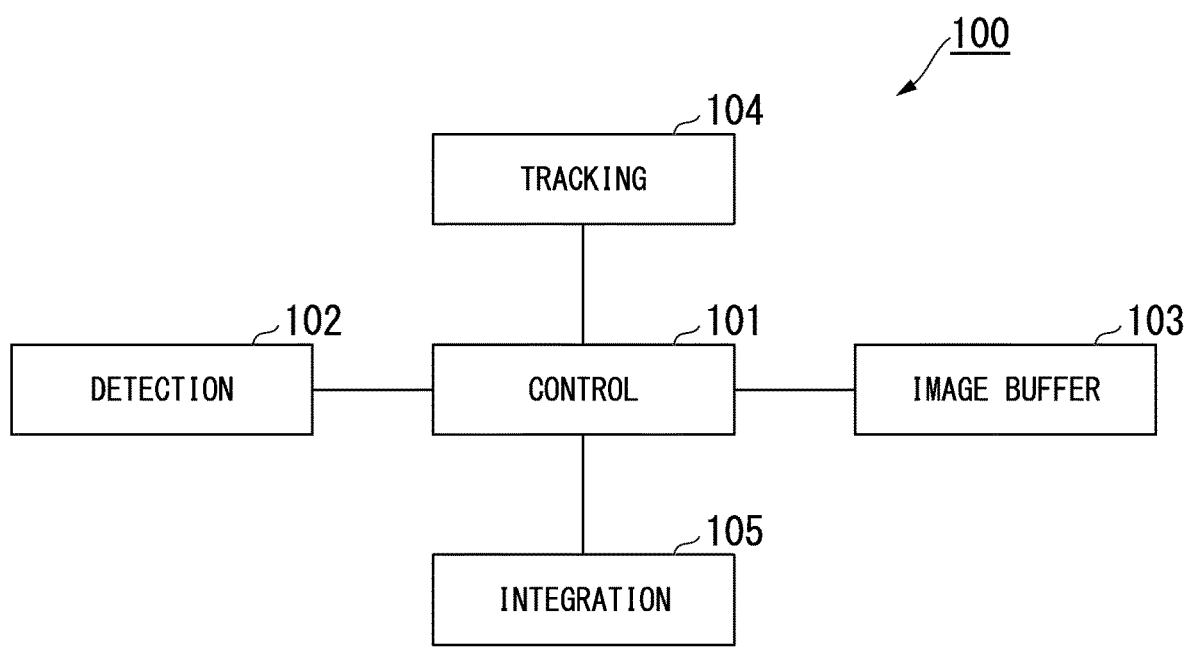
FIG. 1 is a block diagram showing the configuration of an object tracking device according to the first embodiment of the present invention.

FIG. 1 shows the configuration of the object tracking device 100 according to the first embodiment of the present invention, wherein the object tracking device 100 includes a control part 101, a detection part 102, an image buffer 103, a tracking part 104, and an integration part 105.

The control part 101 is configured to control the detection part 102, the image buffer 103, the tracking part 104, and the integration part 105. It is possible for the tracking part 104 to track an object by solely searching at least the surrounding region of an object-detection area upon inputting the information of an object-detection position detected by the detection part 102 which may operate in parallel under the control of the control part 101. The details of the control process of the control part 101 will be discussed later when explaining the operation of the object tracking device 100.

The detection part 102 is configured to detect an area where there exists an object subjected to tracking (i.e. an object-detection area) with respect to a frame image extracted from a video captured by a camera or the like. Herein, it is possible to apply a known detection method to the processing of the detection part 102, for example, it is possible to adopt any one of the object detection methods described in Non-Patent Literature Documents 1 to 4; but this is not a restriction. In the following descriptions, an object detection method will be described with respect to an example using a sliding window.

The image buffer 103 is configured to store at least one or more frame images in an object-tracking video. The tracking part 104 is configured to have an input of frame images stored in the image buffer 103. The image buffer 103 has a function to manage frame images in an order which is determined according to a predetermined condition, thus managing an order of multiple frame images. In the following descriptions, the image buffer 103 is configured to store a plurality of frame images in an ordered manner ranging from an old frame image to a new frame image in terms of their image-capture times; but this is not a restriction. In addition, the image buffer 103 may add a flag for grouping a string of images relating to objects tracked by the tracking part 104. A string of images ranging from an image captured at a previous time with its flag ON to another image with its flag ON at next will be treated as a single unit of images subjected to a tracking process of the tracking part 104.

The tracking part 104 may have inputs of object-detection positions detected by the detection part 102 and frame images stored in the image buffer 103, thus tracking objects by associating objects, which may appear in object-detection positions/areas in a previous frame image, with their object areas in other frame images. The tracking part 104 may employ a known tracking method, for example, it is possible to use temporal association of feature points that are detected according to a corner detection method disclosed in Patent Document 1 (e.g. a method for extracting feature points in proximity to a contour of a person image). Alternatively, it is possible to use an object searching method using a rectangular area in a previous frame image as a key. Upon comparing those methods, it is possible to accurately track objects using the latter tracking method when an object is reflected in a relatively-small region of an image or when an object does not have a partial area such as a corner. The following descriptions refer to an example of a tracking process using the latter tracking method.

The integration part 105 is configured to integrate an object-detection area detected by the detection part 102 and an object-tracking area calculated by the tracking part 104. Herein, it is possible to simply use the tracking result and the detection result of objects. Alternatively, it is possible to calculate an area integrating those results. For example, it is possible to produce an object area (hereinafter, referred to as an integrative object area) integrated with a pair of an object detection area and an object tracking area which are associated with each other. Alternatively, it is possible to respectively produce an integrative object area representing one of an object detection area and an object tracking area which cannot be mutually associated with each other.

Under the control of the control part 101, the image buffer 103 may temporarily store images, and then after completion of an object detection process using frame images via the detection part 102, frame images and object tracking results may be input to the tracking part 104. Accordingly, it is possible to operate the detection part 102 and the tracking part 104 in parallel.

Figure 2:
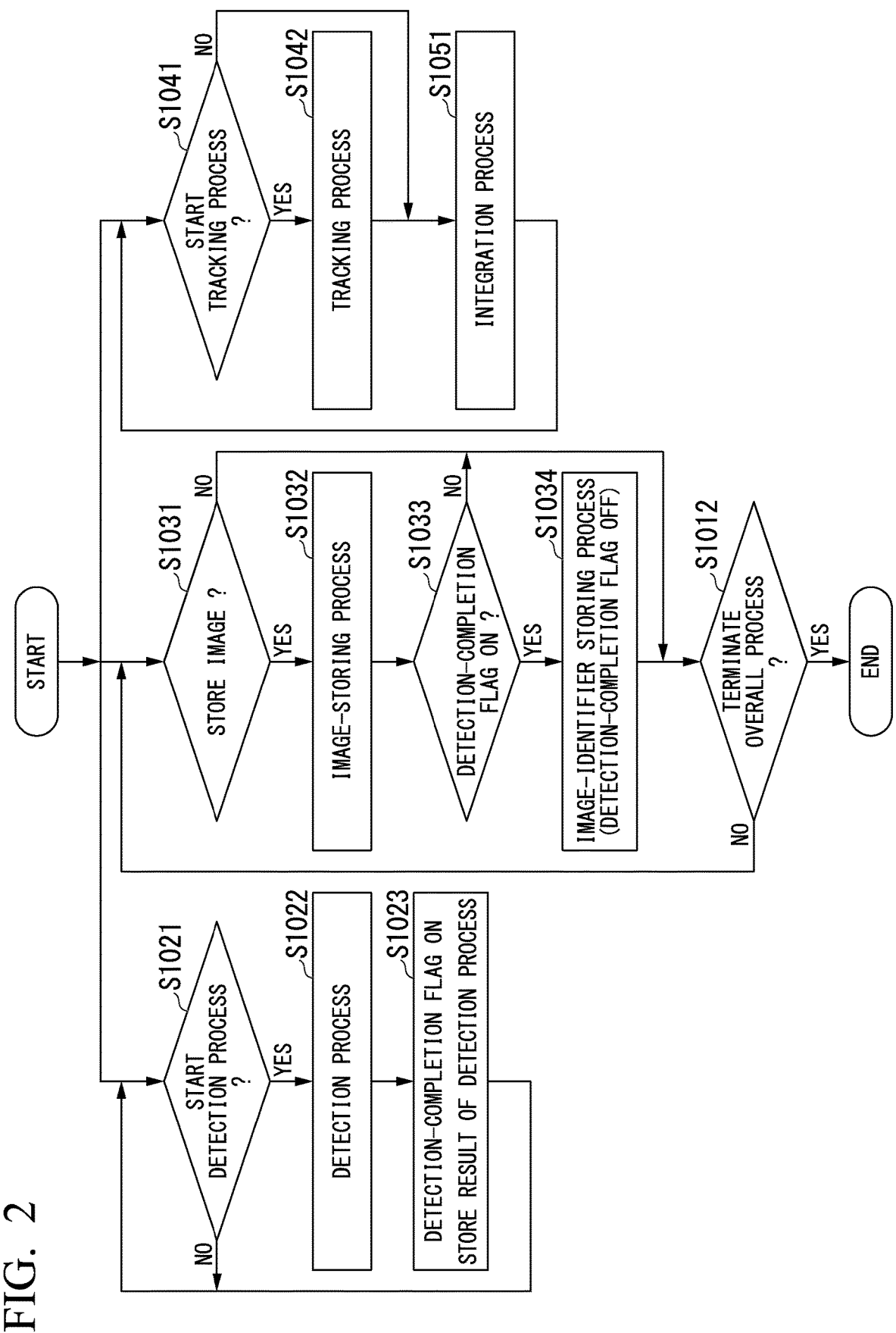
FIG. 2 is a flowchart showing an overall processing of the object tracking device according to the first embodiment of the present invention.

Next, the operation of the object tracking device 100 according to the first embodiment of the present invention will be described with reference to the flowchart of FIG. 2. The following descriptions refer to an example of concurrently operating a process (S1031, S1032) for storing input images of the object tracking device 100 in the image buffer 103, a detection process (S1021, S1022, S1012) for detecting objects by the detection part 102, and an object tracking process (S1041, S1042, S1011) for tracking objects by the tracking part 104.

First, the outline of the overall operation of the object tracking device 100 will be described below. This will explain how the aforementioned processes are associated with each other. Thereafter, each process will be described in detail.

The process for storing input images of the object tracking device 100 in the image buffer 103 includes an image storing determination step (S1031), an image storing process (S1032), and an overall-process termination determination step (S1012). First, the control part 101 may determine whether to store images (S1031). Specifically, when a frame image representing an image captured by a camera or the like is input to the object tracking device 100, a decision of step S1031 turns to "YES" when the frame image is not stored in the image buffer 103 but turns to "NO" when no frame images to be stored in the image buffer 103 exist. Subsequently, the control part 101 stores frame images in the image buffer 103 in a predetermined order (S1032). As described above, a plurality of frame images may be stored in the image buffer 103 in an order ranging from an old frame image to a new frame image in terms of their image-capture times. Next, the control part 101 checks whether a detection-completion flag is ON (S1033). The detection-completion flag indicates whether the detection part 102 completes its previous object detection process. When the detection-completion flag is ON (i.e. when a decision result of S1033 is "YES"), the image buffer 103 may store an identifier (or an image identifier) designating the frame image stored on the image buffer 103 as well. Subsequently, the control part 101 turns the detection-completion flag OFF (S1034). In this connection, the detection-completion flag should be initialized to ON when starting the overall operation of the object tracking device 100.

The foregoing steps S1033 and S1034 aim to designate an image used for detecting an object, and therefore an image identifier can be stored in the image buffer 103 according to another procedure. For example, it is possible to calculate an average processing time of an object detection process for each image based on a time-related history of object detection processes, and therefore it is possible to detect an image which is stored after an average processing time has passed from a most recent timing of an image given an image identifier. Specifically, when it takes a long time to detect an object so that a state where the detection-completion flag does not become ON may continue for a while, it is possible to store an image identifier for an image which may appear after an average processing time has passed from a most recent timing of an image given an image identifier, instead of storing an image identifier for an image at a timing of turning the detection-completion flag ON. Accordingly, it is possible to reduce fluctuations of time intervals between images used to detect objects.

Thereafter, the control part 101 determines whether to terminate the overall process (S1012). Herein, the control part 101 may terminate the overall process of the object tracking device 100 when a string of images used to detect objects or a string of images used to track objects does not exist and when the object detection process (S1022, S1023), the object tracking process (S1042), and the result integration process (S1051) are not being executed.

First, the detection part 102 may determine whether to start an object detection process (S1021). A decision result of S1021 turns to "YES" so that the detection part 102 may carry out an object detection process with respect to the oldest image over time (S1022) when the object detection process has not been carried out irrespective of the existence of images designated by image identifiers stored in the image buffer 103 (S1034). In this connection, the details of the object detection process (S1022) will be discussed later. After completion of the object detection process, the detection part 102 turns the detection-completion flag ON and stores the detection result of an object (S1023). When the decision result of S1021 is "NO", the object detection process is skipped, thus returning to a step for determining whether to start the object detection process (S1021).

Figure 3:
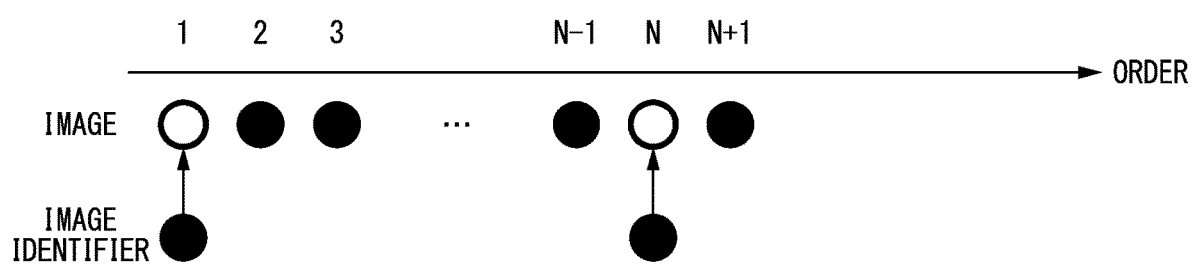
FIG. 3 is a schematic diagram showing the relationship between image identifiers and images subjected to object detection/tracking.

FIG. 3 shows the relationship between the aforementioned images and their image identifiers. Herein, N+1 frame images have been stored in the image buffer 103 together with an image identifier designating a first frame and an image identifier designating an Nth frame. In FIG. 3, images designated by image identifiers are each denoted as a white circle while other images are denoted as black circles.

First, the tracking part 104 determines whether to start an object tracking process (S1041). As shown in FIG. 3, when an object tracking process has not been started with respect to a string (hereinafter, referred to as a tracking-image string) including two images designated by two image identifiers and other images existing therebetween, the tracking part 104 determines to start the object tracking process (i.e. decision result "YES" of S1041). Accordingly, the tracking part 104 may execute the object tracking process which will be described later (S1042). FIG. 3 shows a tracking-image string as a string of N images ranging from frame 1 to frame N. Instead of the tracking-image string, a tracking-image group obtained by extracting a part of the tracking-image string can be set as tracking target images. When a decision result of S1041 is "NO", the tracking part 104 determines whether to start the object tracking process again (S1041), and the tracking part 104 waits until a tracking-image string is generated. After completion of the object tracking process (S1042), it is possible to delete an image identifier applied to a first image in the tracking-image string. In this connection, it is possible to delete an image identifier from an image included in the tracking-image string except for images included in another tracking-image string.

Thereafter, the integration part 105 may carry out an integration process for integrating the detection result of the detection part 102 and the tracking result of the tracking part 104 (S1051). When a detection result of a last image in the tracking-image string remains to be obtained, the integration part 105 may wait for a while to start the integration process (S1051) until the detection result 102 produces the detection result. Concrete examples of the integration process (S1051) will be described later together with concrete examples of the detection process (S1022) and the tracking process (S1042).

Figure 4:
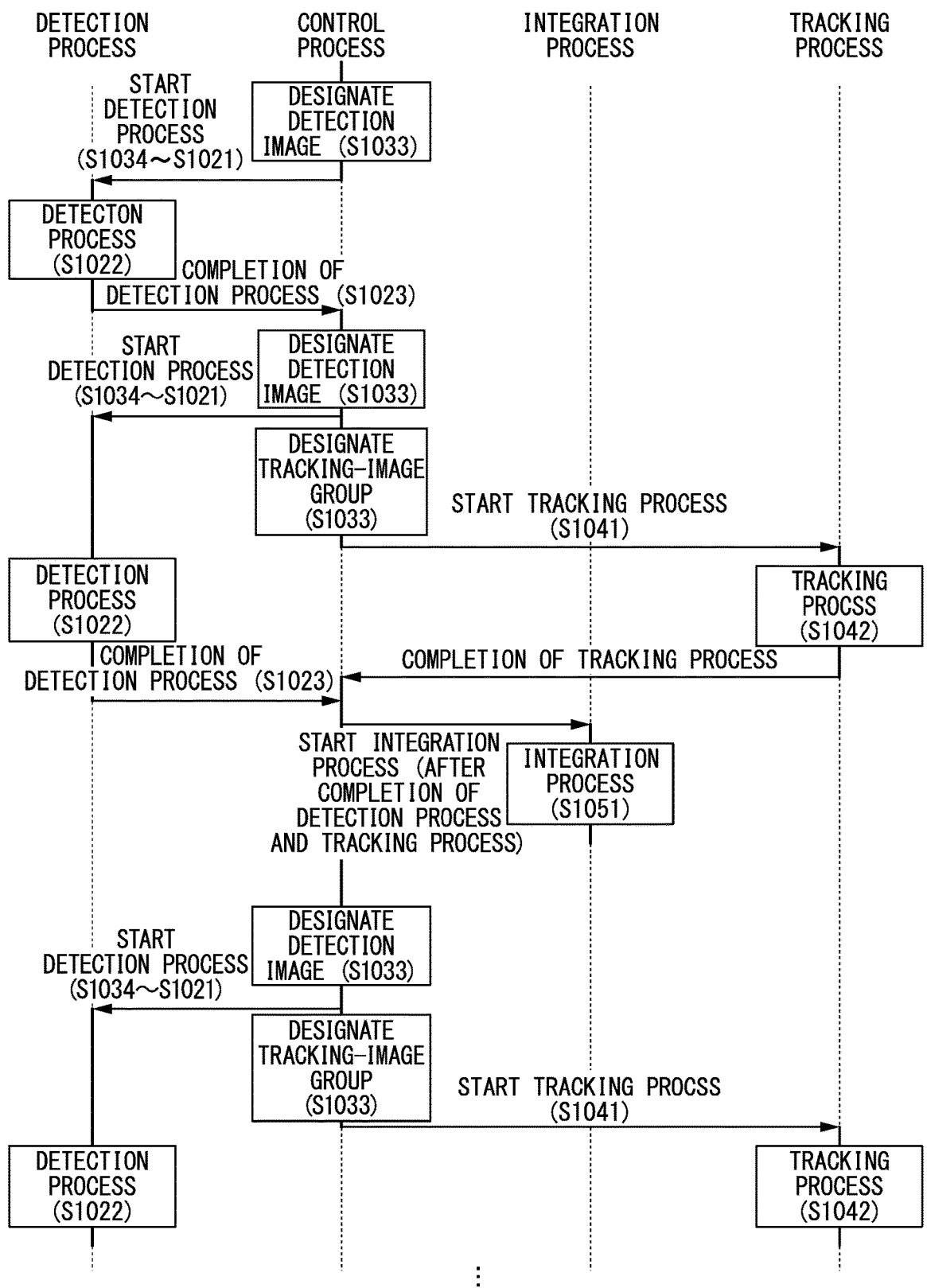
FIG. 4 is a sequence diagram diagrammatically showing the relationship among a detection process, a tracking process, an integration process, and a control process relating to objects.

FIG. 4 is a sequence diagram diagrammatically showing the relationship between the detection process, the tracking process, the integration process, and the control process relating to objects. In the drawing sheet of FIG. 4, a time course is shown from top to bottom, indicating timings to execute individual processes and their relevancy.

First, the detection process is started (S1034, S1021) upon designating a detection image (S1033), and therefore the detection process (S1022) will be carried out. Upon completion of the detection process (S1023), another detection image is designated (S1033) again so that the detection process will be carried out (S1022). In addition, the tracking process will be carried out (S1042) upon designating a tracking-image group (e.g. the tracking-image string determined in S1033 or an image group extracted as part of the tracking-image string). Upon completion of both the detection process (S1022) and the tracking process (S1042), the integration process (S1051) will be carried out. Thereafter, a step of designating a detection image, a detection process, a step of designating a tracking-image group, a tracking process, and an integration process will be carried out repeatedly.

The above example may determine to complete the detection process using a detection-completion flag, whereas it is unnecessary to adopt such a method using a detection-completion flag when it is possible to control operations according to the procedure shown in FIG. 4. Instead of using the detection-completion flag, for example, it is possible to implement mutually signaling the start timing and the end timing for each process among the control part 101, the detection part 102, the tracking part 104, and the integration part 105 according to the procedure shown in FIG. 4.

Figure 5:
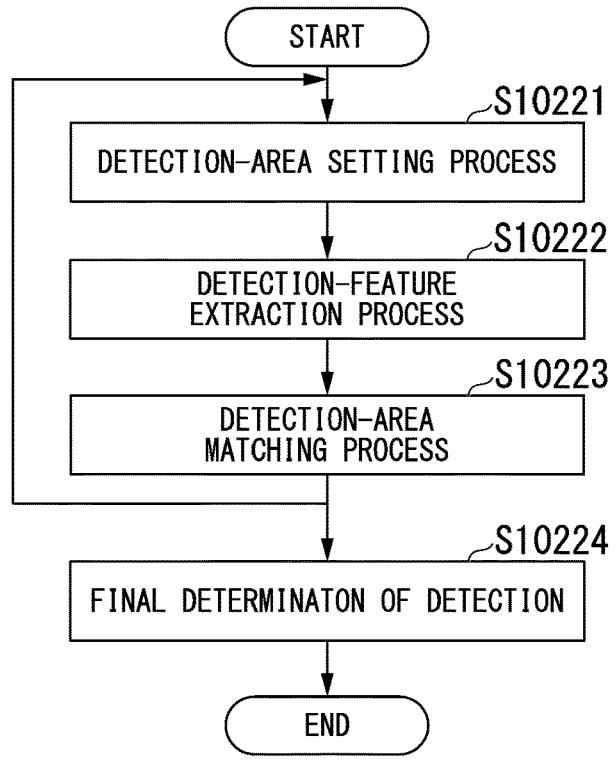
FIG. 5 is a flowchart showing one example of a detection process relating to objects.

Next, the detection process, the tracking process, and the integration process will be described in detail. The detection process (S1022) may provide a template for an object subjected to detection in advance, and therefore the detection process 102 may determine the position of an object appearing in each image using the template. FIG. 5 is a flowchart showing an example of the detection process (S1022). The detection part 102 is configured to set a detection area in each image (i.e. a detection-area setting process S10221), to extract image features from the detection area (i.e. a detection-feature extraction process (S10222), to compare image features with features calculated from the template, and to thereby calculate an object-detection score with respect to the detection area (i.e. a detection-area matching process S10223). As image features extracted from the detection area, it is possible to use features of known types, e.g. luminance values or luminance gradients. It is possible to calculate scores for detecting objects using a known calculation method, e.g. a norm or an inner product of two vectors. When setting areas in images, a series of processes S10221 through S10223 will be repeated until a detection-area matching process is completed with respect to all areas corresponding to the template, which can be presumed in images, by way of raster-scanning (e.g. sliding windows) areas corresponding to the template in images. After repetition of those processes, the detection part 102 may execute a detection final determination process (S10224). Specifically, an area having an object-detection score above a predetermined value will be finally determined as an object area. When an image includes an area where an object exists, another area obtained by slightly shifting the area may have a relatively high object-detection score; hence, it is possible to finally determine an object area as an area, which may have a higher object-determination score than its surrounding areas, in association with comparison between the object-detection score and its threshold value. In addition, it is not always the case that an image should normally include a single object; hence, it is not necessary to normally use a single template with respect to an image including multiple objects. In this case, it is possible to calculate object-matching scores with respect to all combinations between templates and template-corresponding areas. When fixing template-corresponding areas in images, for example, it is possible to finally determine the detection result using a maximum value among scores relating to types of templates. As described above, it is possible to employ a known detection method as the detection process, e.g. the foregoing detection methods disclosed in Non-Patent Documents 1 through 4.

The tracking part 104 is configured to execute a tracking process (S1042) with respect to a first image in a tracking-image string, and objects, which are located at object positions produced by the integration process (S1051) or which are located at object positions determined according to previous results of tracking, will be tracked in the tracking-image string until its last image. In this connection, the last image of the tracking-image string may serve as a first image of its next tracking-image string; hence, it is necessary to input tracking results with respect to previous strings of images prior to the tracking-image string.

Figure 6:
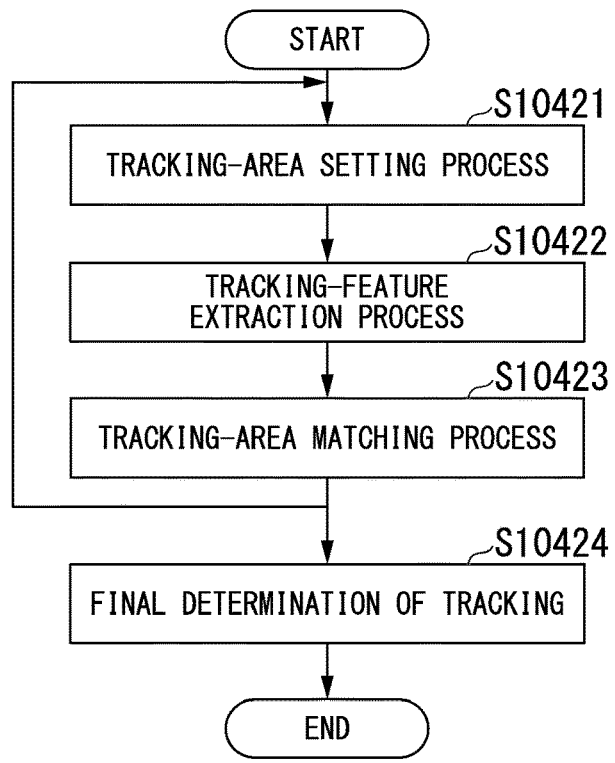
FIG. 6 is a flowchart showing one example of a tracking process relating to objects.

FIG. 6 is a flowchart showing an example of a tracking process (S1042). The tracking part 104 is configured to set tracking areas in images (i.e. a tracking-area setting process (S10421), to extract image features from tracking areas (i.e. a tracking-feature extraction process S10422), to compare image features with features calculated from templates, and to calculate object-tracking scores in tracking areas (i.e. a tracking-area matching process S10423). The tracking part 104 will repeat those processes. As a template, it is possible to use an image at an object position (or an object area) before starting tracking; but this is not a restriction. In addition, the tracking process should not be limited to a single object; hence, it is possible to use a template for each object when tracking multiple objects. Herein, it is possible to set tracking areas in images for the purpose of searching object positions, which can be determined from tracking results of previous images, and their surrounding areas. In addition, a surrounding area around an object position determined by the integration process (S1051) can be set as a tracking area for a first image of a tracking-image string, instead of an object position determined by the result of tracking. In particular, a surrounding area around an object position determined by the integration process (S1051) can be set as a tracking area for a tracking process firstly carried out after starting the overall process of the object tracking device 100, because a previous tracking result does not exist. As a method of extracting image features or a method of calculating scores, it is possible to use known methods; it is possible for the tracking process to use same image features as image features used in the foregoing detection process, alternatively, it is possible for the tracking process to use different image features than image features used for the detection process. After repetition of the above processes (S10421 through S10423), the tracking part 104 may finally determine the tracking result (S10424) as similar to the foregoing detection final determination process (S10224). In addition, it is possible to add an identifier (or an object-tracking ID) for each object so as to discriminate objects by themselves since the tracking process (S1024) is able to track each object. For example, it is possible to add anew identifier to an object which has not been subjected to tracking in the previous tracking process, thus assuming identifiers depending on objects being tracked between images. In this connection, it is possible to use a known method as the tracking process, e.g. the foregoing tracking methods disclosed in Non-Patent Documents 4, 5 and Patent Document 1.

Figure 7:
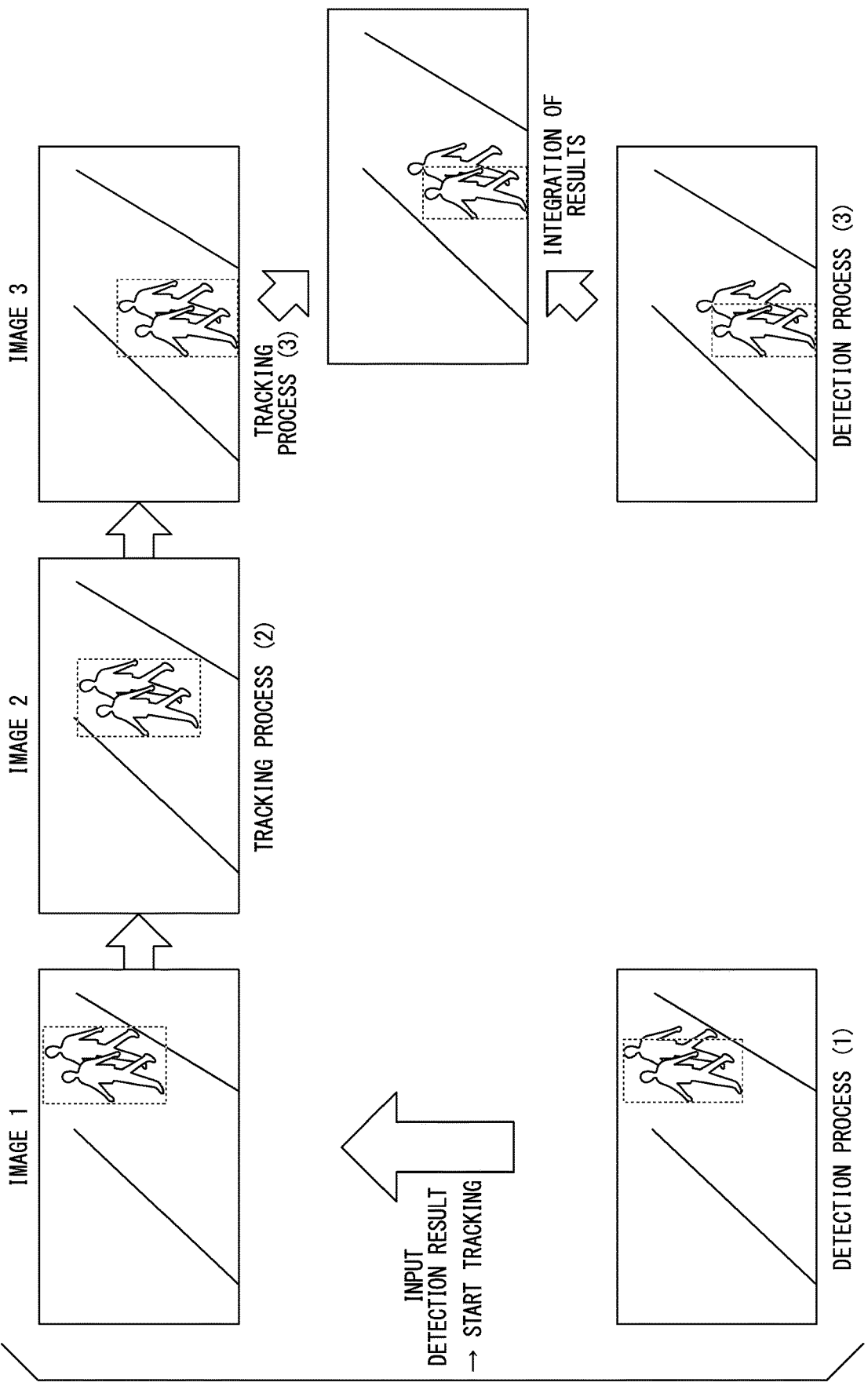
FIG. 7 is a schematic diagram showing one example of the integration process to integrate the detection process and the tracking process relating to objects.

The integration process (S1051) is configured to integrate an object position, which is detected by the detection part 102 with respect to a last image of a tracking-image string, and an object position determined by the tracking part 104 together. FIG. 7 shows an example of the integration process to be executed with respect to a first tracking-image string after starting the overall process of the object tracking device 100. FIG. 7 shows three images (i.e. image 1 through image 3) as a tracking-image string, thus illustrating an integration process to be carried out according to a procedure shown by arrows. Firstly, detection process (1) detects an area of a desired object (e.g. a person) (image 1). No detection process is carried out with respect to a second image (image 2), but detection process (3) will be carried out with respect to a third image (image 3). In the initial condition before which no tracking process has been carried out, the result of detection process (1) will be a final determination result, which is input to carry out tracking process (2) for image 2 and tracking process (3) for image 3. Concurrently with those tracking processes, detection process (3) will be carried out with respect to image 3. The integration process may integrate the result of detection process (3) and the result of tracking process (3). As a method of integrating the detection result and the tracking result, it is possible to contemplate various methods. For example, it is possible to contemplate integration methods (I), (II), and (III) as follows.

(I) Method of Producing Detection Result as the Final Result Irrespective of Tracking Result FIG. 7 shows an example of this integration method. Herein, two persons overlapped in a fore-and-aft direction is erroneously detected as a single person when executing detection process (1). Since tracking processes are carried out with respect to image 2 and image 3 based on the erroneous detection result, two persons overlapped in a fore-and-aft direction will be continuously tracked. On the other hand, detection process (3) for image 3 may correctly detect an area of a person in front between two persons overlapped in a fore-and-aft direction. According to this integration method, it is possible to produce an effect of consequently correcting a person area while tracking a person.

(II) Method of Producing Tracking Result as the Final Result Irrespective of Detection Result This method is able to produce an effect of correcting a leakage of detecting persons due to repetition of detection processes even when two persons may be temporarily overlapped in a fore-and-aft direction.

(III) Method of Associating Detection Result with Tracking Result and Determining a New Tracking Object According to Detection Result not Associated with Tracking Result It is possible to associate the detection result with the tracking result according to a known method such as a Hungarian method. In this connection, it is not necessary to establish an association between results when it is difficult to associate the detection result with the tracking result; hence, it is possible to use both the detection result and the tracking result. The object position for establishing the association between the detection result and the tracking result may be either the object position determined according to the detection result or the object position determined according to the tracking result. In this case, it is possible to produce both the effect of correcting a person area as described in (I) and the effect of correcting a leakage of detection as described in (II). When the tracking process is configured to manage a plurality of identifiers for discriminating a plurality of objects, it is possible for the integration process (S1051) to add a new identifier (ID) to the detection result not associated with the tracking result.

Figure 8:
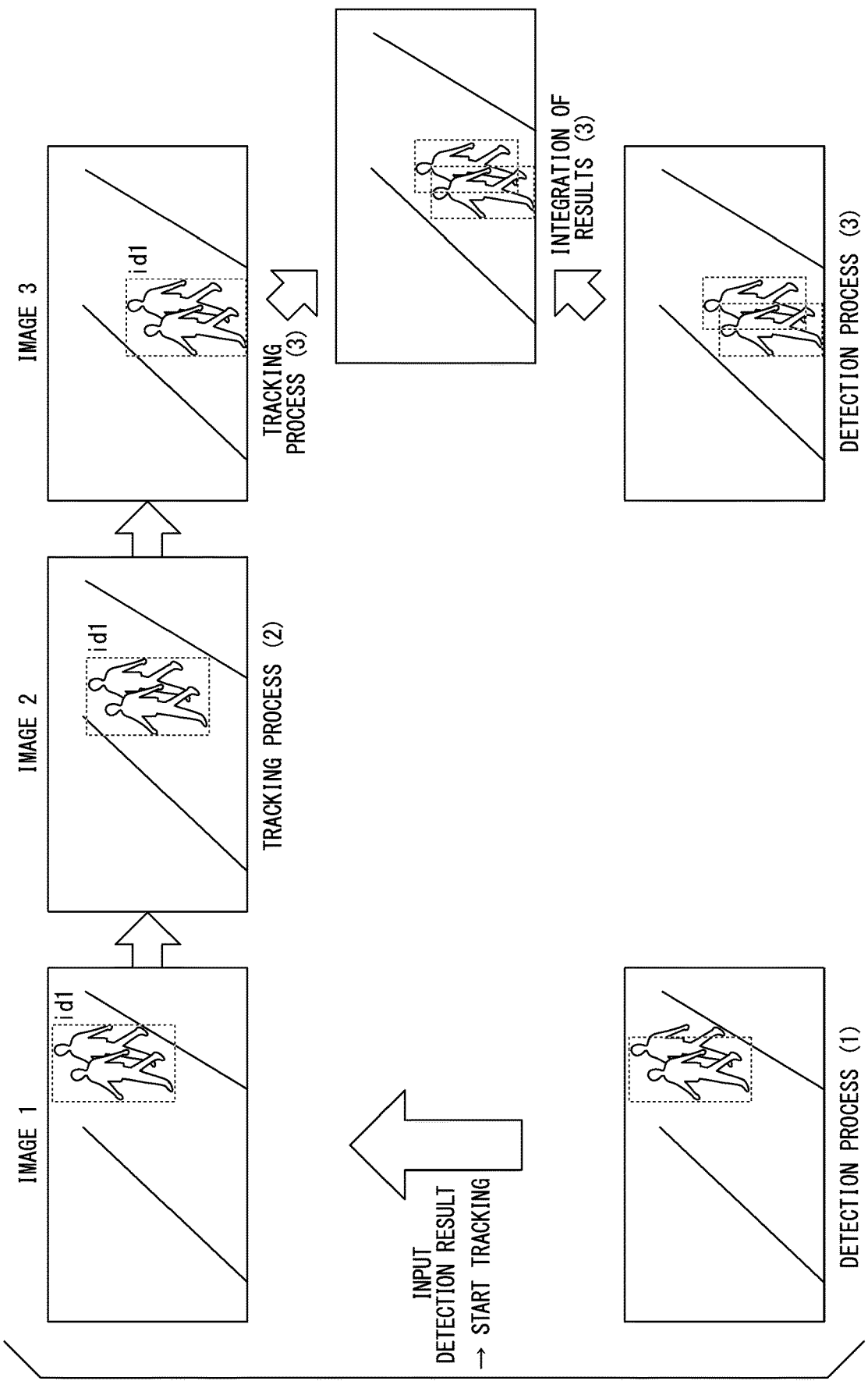
FIG. 8 is a schematic diagram showing another example of the integration process to integrate the detection process and the tracking process relating to objects.

FIG. 8 shows another example of the integration result according to the integration method (I). Similar to FIG. 7, FIG. 8 shows a tracking-image string including three images (image 1 through image 3). Detection process (1) for image 1 may erroneously detect two persons overlapped in a fore-and-aft direction (see an image identifier id1) as a single person. Since tracking process (2) and tracking process (3) will be carried out with respect to image 2 and image 3 based on the erroneous detection result, the two persons overlapped in a fore-and-aft direction will be erroneously tracked as a single person. On the other hand, detection process (3) for image 3 may properly detect person areas respectively with respect to two persons overlapped in a fore-and-aft direction. As a result of the integration process, it is possible to properly detect two persons. Based on the integration result, a tracking process will be carried out with respect to the next tracking-image string.

The first embodiment of the present invention may produce various effects, which will be described below. The present embodiment should necessarily include the control part 101 and the image buffer 103 in order to execute parallel processing of detection/tracking processes such that an object-tracking process will be executed using the result of an object-detection process. In addition, the present embodiment is configured to narrow down tracking-image strings subjected to object tracking by turning ON/OFF the flags used to indicate completion of detection processes for objects, thus realizing parallel processing of the object-detection process and the object-tracking process and improving calculation efficiency of the object-tracking process. In addition, it is possible to correct the tracking result of objects using the detection result of objects, and therefore it is possible to execute the overall process of the object tracking device 100 with a high precision. Moreover, it is possible to correct an object-tracking position (or an object-tracking area) using the detection result of objects.

Second Embodiment

The configuration and the operation of the object tracking device 100 according to the second embodiment of the present invention will be described in detail with reference to FIGS. 9 to 13. Compared to the first embodiment, the second embodiment aims to discriminate objects reflected in videos by additionally providing a matching part configured to determine types of objects. In the following descriptions, the descriptions relating to the same configuration and the same operation as the configuration and the operation of the first embodiment will be omitted here; hence, only the differences between the first embodiment and the second embodiment will be described below.

Figure 9:
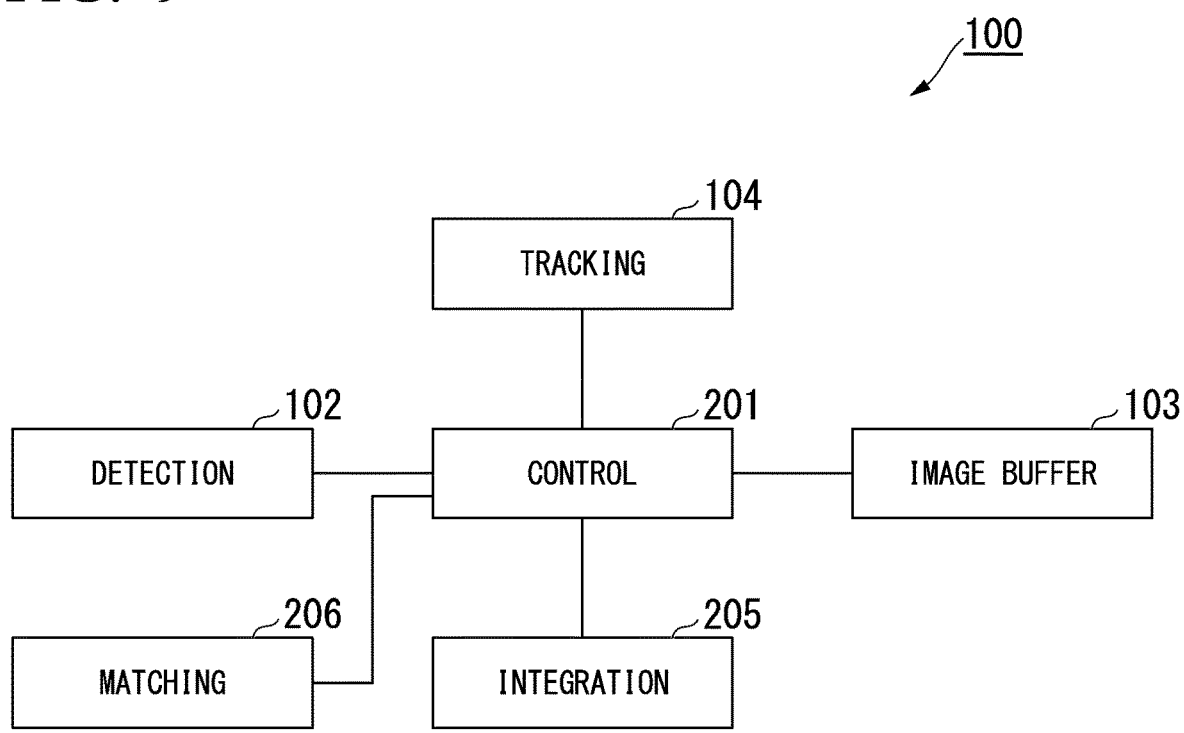
FIG. 9 is a block diagram showing the configuration of an object tracking device according to the second embodiment of the present invention.

FIG. 9 shows the configuration of the object tracking device 100 according to the second embodiment, which includes a control part 201, the detection part 102, the image buffer 103, the tracking part 104, an integration part 205, and a matching part 206. Herein, the detection part 102, the image buffer 103, and the tracking part 104 are similar to those of the first embodiment; hence, the descriptions thereof will be omitted here. In this connection, the tracking part 104 is configured to manage identifiers (IDs) for identifying types of objects in addition to positions of objects according to the foregoing method. The integration part 205 has the function to integrate identifiers (IDs) identifying types of objects in addition to the foregoing function of the integration part 105 of the first embodiment.

The matching part 206 is configured to identify types of objects using templates which are prepared in advance for types of objects subjected to detection. As to objects representing persons, the matching part 206 may use templates which are generally prepared for individual persons while the detection part 102 may use templates which are generally used to detect persons. The following descriptions refer to the utilization of two types of templates. The matching part 206 may use templates in association with identifiers (hereinafter, referred to as object-type identifiers (IDs)) representing types of objects (e.g. persons). The matching part 206 is configured to execute a matching process with respect to an arbitrarily-input area, for example, it is possible to carry out a matching process with respect to object positions (or areas) detected by the detection process, object positions (or areas) produced by the tracking process, and object positions produced by integrating those object positions. The following descriptions refer to a matching process executed with respect to object positions (or areas) detected by the detection process. As described above, the detection part 102 may use object-detection templates not depending on types of objects while the matching part 206 may use templates prepared for individual types of objects; but this is not a restriction.

Figure 10:
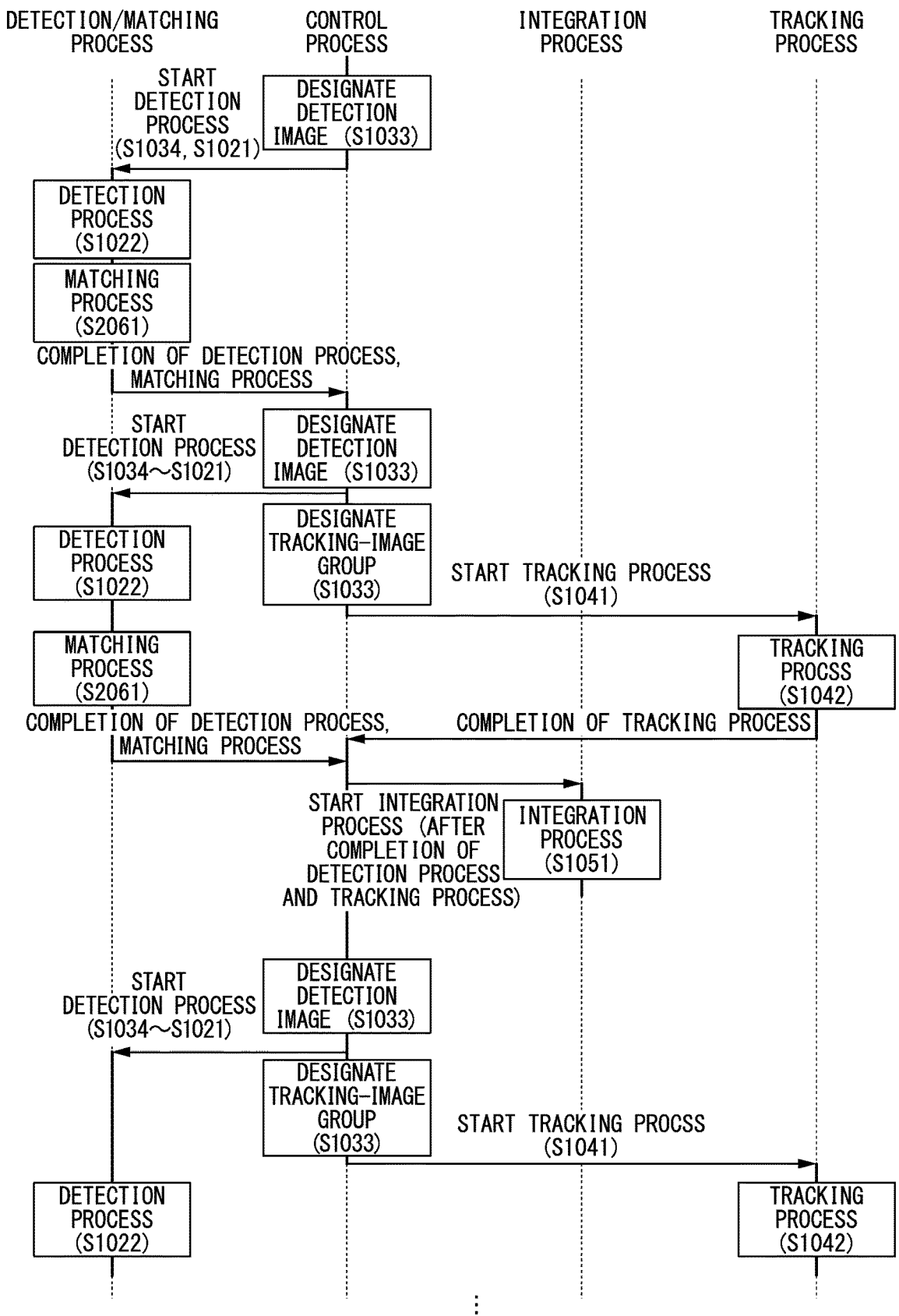
FIG. 10 is a sequence diagram diagrammatically showing the relationship among a detection process, a tracking process, an integration process, and a control process relating to objects.

FIG. 10 is a sequence diagram diagrammatically showing the relationship between the detection process, the tracking process, the matching process, and the control process. Compared to the sequence diagram of FIG. 4, the sequence diagram of FIG. 10 is designed to continuously execute the detection process (S1022) and the matching process (S2061) over time. That is, the sequence diagram of FIG. 10 is designed to cause the detection process to start after completion of the matching process following completion of the detection process; but it is possible to operate those processes in parallel.

Figure 11:
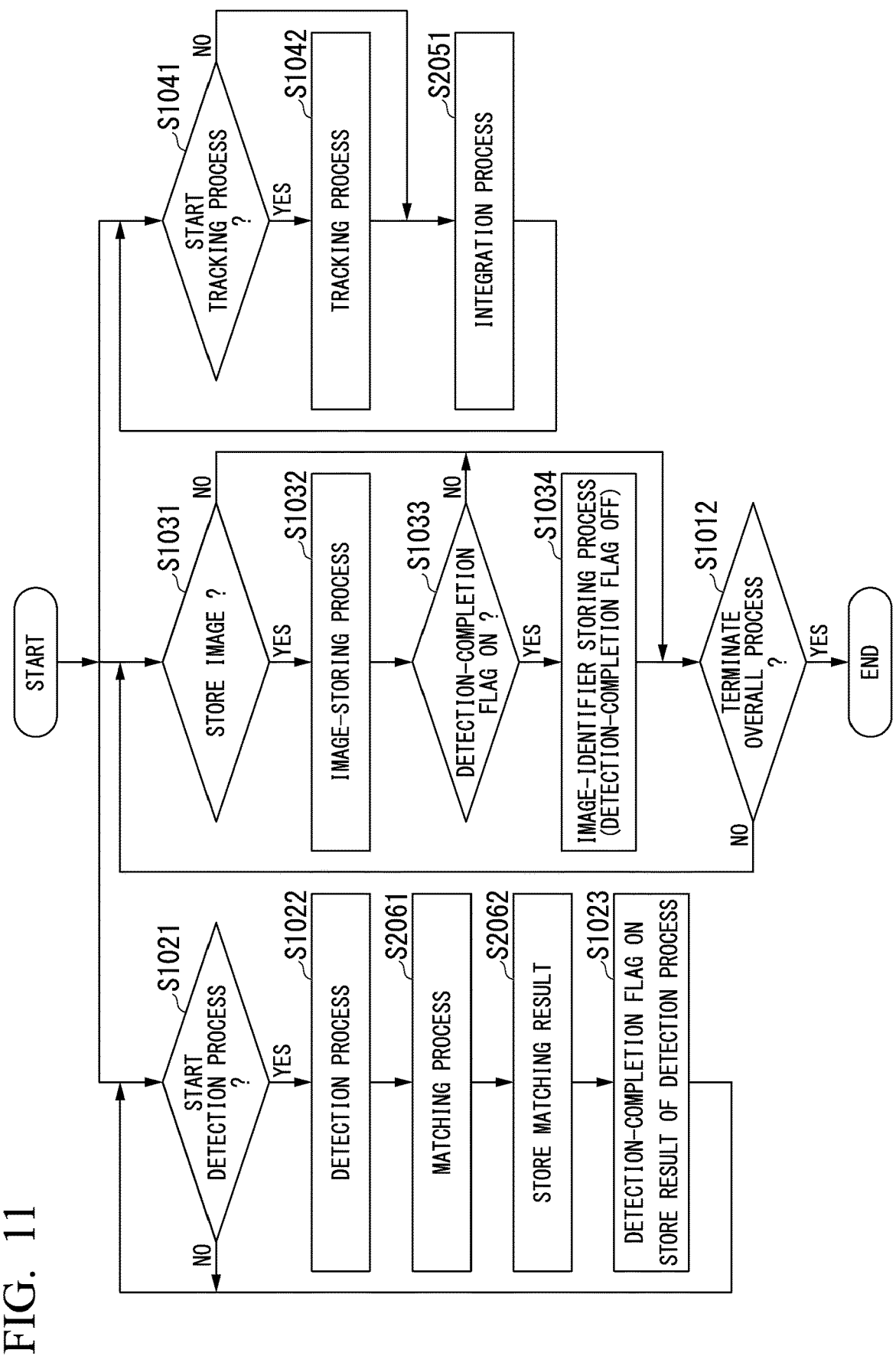
FIG. 11 is a flowchart showing an overall process of the object tracking device according to the second embodiment of the present invention.

Next, the overall process of the object tracking device 100 according to the second embodiment will be described with reference to the flowchart of FIG. 11. In FIG. 11, the descriptions of the same steps as the foregoing steps of FIG. 2 (i.e. S1012, S1021 through S1023, S1031 through S1034, and S1041 through S1042) will be omitted here. The flowchart of FIG. 11 differs from the flowchart of FIG. 2 in that the matching part 206 may carry out a matching process (S2061 through S2062) subsequently to the detection process (S1022) while the integration process (S1051) is replaced with an integration process (S2051).

The matching part 206 may carry out the matching process (S2061). That is, the matching part 206 may compares an object at an object position (or an area), which is detected by the detection process (S1022), with matching-processing templates to determine which template is matched, thus obtaining an object-type identifier (ID) associated to the matching-processing template. Similar to the detection process, the matching process may calculate an image feature using an image at an object position (or an area) and the matching-processing template according to a known method, calculate a matching score according to a known method, and thereby obtain an object-type identifier (ID) associated to the template most resembling the image at the object position (or area). Upon determining low similarity with respect to all templates, the matching part 206 may determine "no matching result" so as not to obtain an object-type identifier (ID). After completion of the matching process (S2061), the matching part 206 may store the result of the matching process (S2062).

Next, the integration part 205 may carry out the integration process (S2051). After executing the integration process (S1051) similar to that of the first embodiment, the integration part 205 may receive the result of the matching process (S2061), wherein when the object-type identifier (ID) has been obtained, the integration part 205 may store the object-type identifier (ID) in connection with the object-tracking identifier (id) used for the previous tracking process (S1042).

Figure 12:
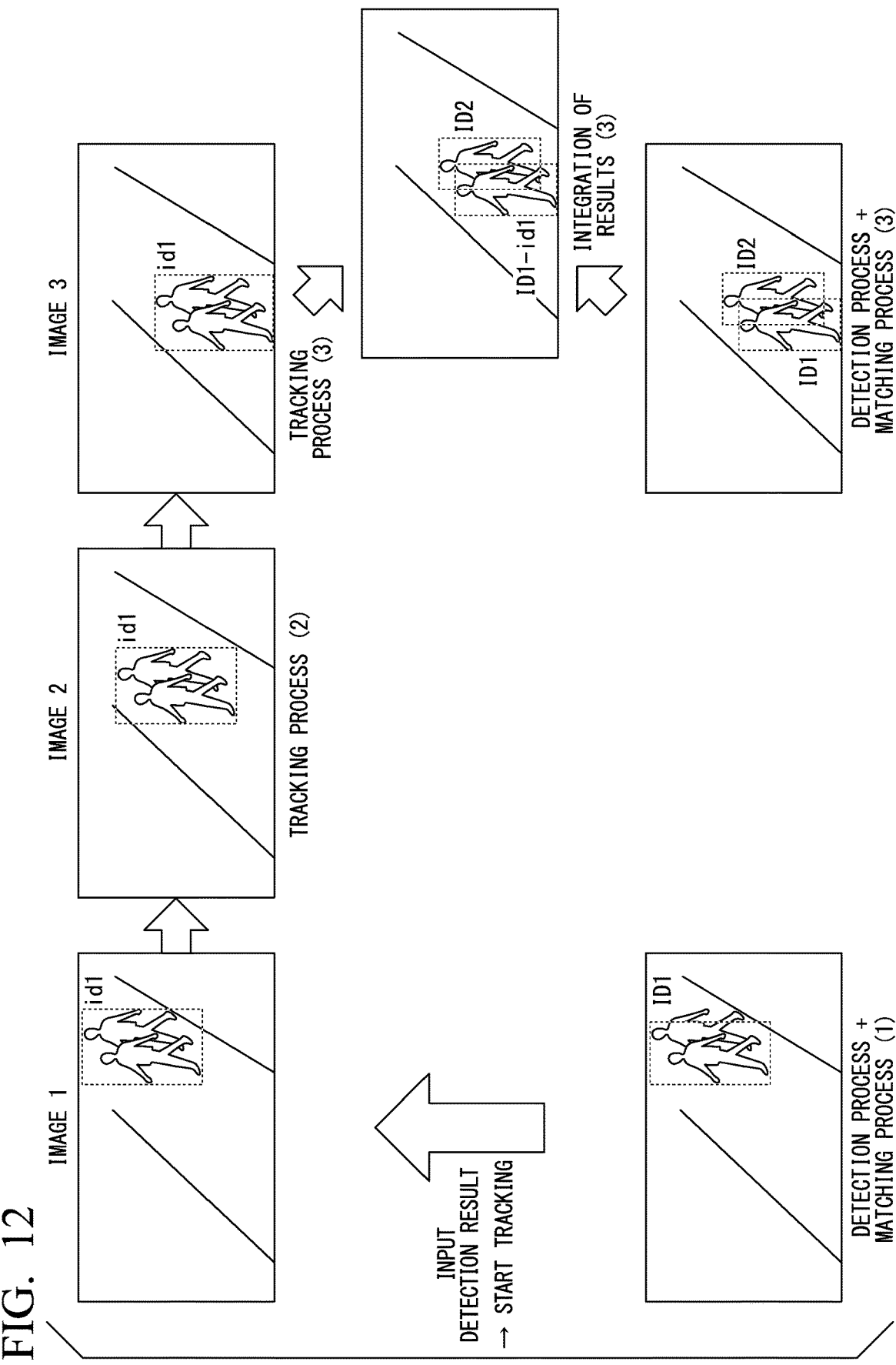
FIG. 12 is a schematic diagram showing one example of an integration process to integrate the detection process, the matching process, and the tracking process.

FIG. 12 shows an example of a procedure including the detection process, the matching process, and the integration process upon adopting the foregoing integration processing method (III). Similar to FIG. 7 and FIG. 8, FIG. 12 shows the utilization of three images (i.e. image 1 through image 3) each illustrating two persons overlapped in a fore-and-aft direction. In FIG. 12, the detection process for image 1 erroneously detects two persons overlapped in a fore-and-aft direction as a single person, but the matching process can obtain a proper object-type identifier (D). Based on the erroneous detection result, the tracking process is carried out with respect to image 1 to image 3 by still tracking two persons overlapped in a fore-and-aft direction as a single person. The tracking process designates an object-tracking identifier (id). The detection process for image 3 can properly detect individual person areas as two persons overlapped in a fore-and-aft direction, and therefore the matching process can properly obtain object-tracking identifiers (ID1, ID2). The integration process determines that an object (i.e. a person) assigned the object-tracking identifier ID1 is associated with an object (i.e. a person) assigned the object-tracking identifier id1, thus producing an integrated object position as the object position (or area) detected by the detection process. At the stage of the integration process, an object assigned the object-type identifier ID2 has not been assigned the object-tracking identifier (id) and therefore not associated with an object having the object-type identifier ID2. When executing the tracking process subsequently to the integration process of FIG. 12, an object having the object-type identifier ID2 will be assigned a new object-tracking identifier (e.g. id2).

An advantage of the aforementioned integration method is to correct an erroneous tracking result to a proper result irrespective of the occurrence of an erroneous tracking result of the tracking process for tracking mutually-overlapped objects.

Figure 13:
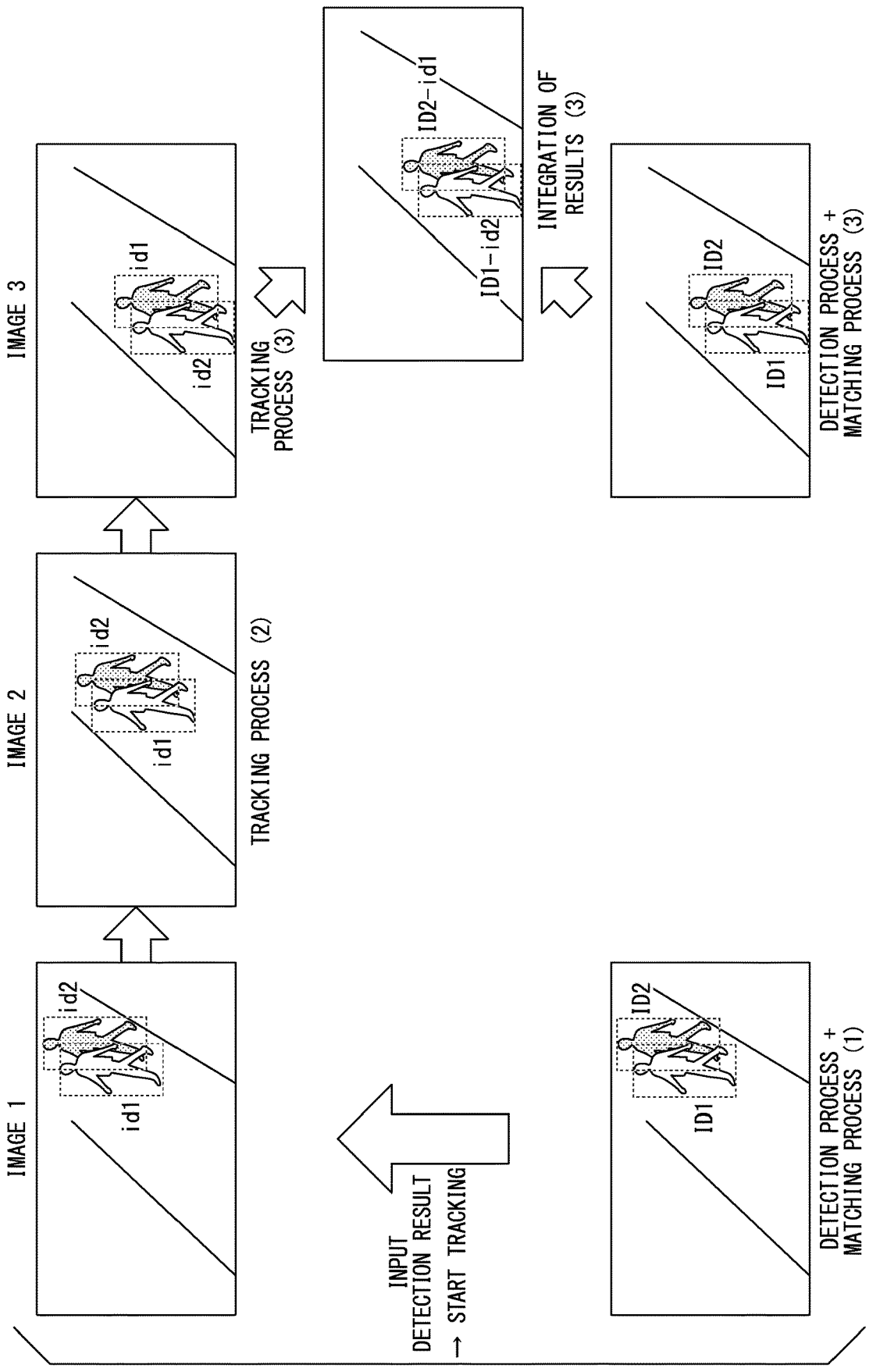
FIG. 13 is a schematic diagram showing another example of an integration process to integrate the detection process, the matching process, and the tracking process.

Next, another example of a procedure including the detection process, the matching process, the tracking process, and the integration process will be described with reference to FIG. 13. Similar to FIG. 12, FIG. 13 shows image 1 through image 3 each illustrating two persons overlapped in a fore-and-aft direction, but it is possible to individually recognize two persons. According to "detection process+matching process (1)" for image 1, a front person is assigned an object-type identifier ID1 while a back person is assigned an object-type identifier ID2. In the tracking process, the front person is assigned an object-tracking identifier id1 while the back person is assigned an object-tracking identifier id2. According to tracking process (3) for image 3, unlike tracking process (2) for image 2, two persons are erroneously recognized in their front and back positions such that the front person is assigned the object-tracking identifier id2 while the back person is assigned the object-tracking identifier id1. According to "detection process+ matching process (3)" for image 3, two persons are properly determined such that the front person is assigned the object-type identifier ID1 while the back person is assigned the object-type identifier ID2. Using the foregoing integration method (III), the object-type identifier ID1 is associated with the object-tracking identifier id2 while the object-type identifier ID2 is associated with the object-tracking identifier id1. For this reason, through comparison with the results of integration process (3) upon storing the association between object-type identifiers and object-tracking identifiers established when starting the tracking process in advance, it is possible to detect erroneous determination of objects in the tracking process, and therefore it is possible to prevent the erroneous determination from influencing the latter process. In other words, it is possible to correctly calculate moving tracks of objects.

As described above, the second embodiment may have a function to assign object-type identifiers (IDs) to objects by the matching part 206 in addition to the foregoing function of the first embodiment; hence, it is possible to produce an effect of correcting erroneous determination of objects in the tracking process in addition to the foregoing effect of the first embodiment.

Third Embodiment

The configuration and the operation of the object tracking device 100 according to the third embodiment of the present invention will be described with reference to FIG. 14 and FIG. 15. The third embodiment further includes a reverse tracking part in addition to the foregoing constituent elements of the first embodiment. In the following descriptions, the same configuration and the same operation as those of the first embodiment will be omitted here, and therefore only the differences between the first embodiment and the third embodiment will be described below.

Figure 14:
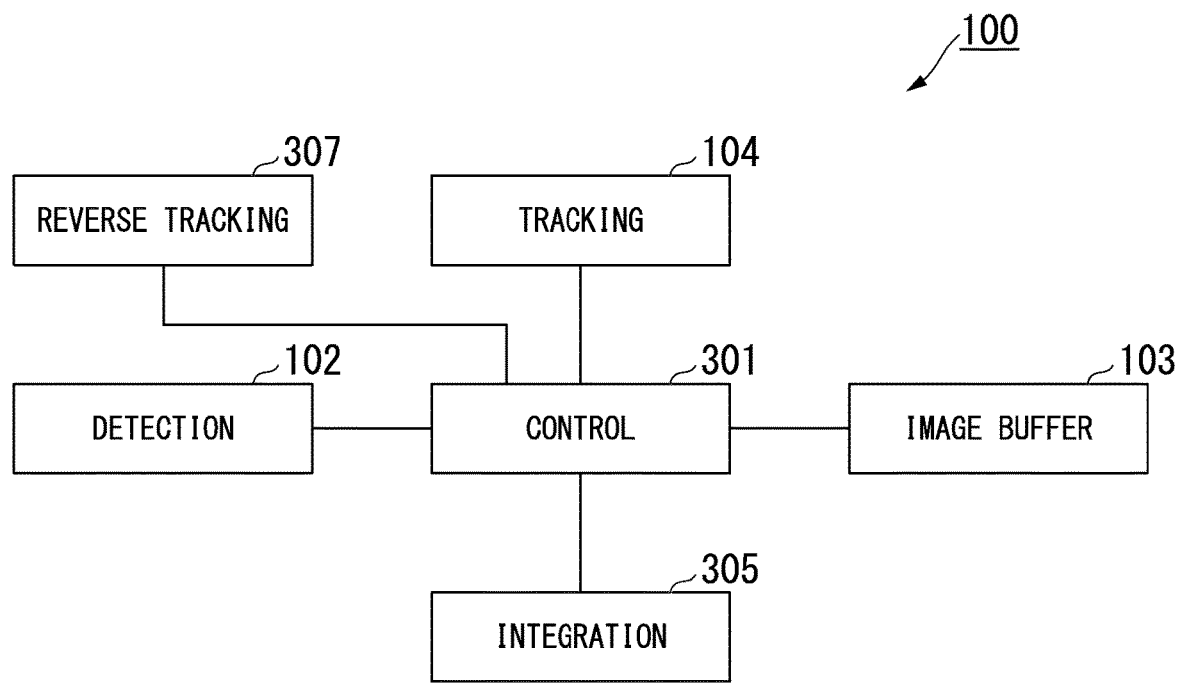
FIG. 14 is a block diagram showing the configuration of an object tracking device according to the third embodiment of the present invention.

FIG. 14 shows the configuration of the object tracking device 100 according to the third embodiment of the present invention, which includes a control part 301, the detection part 102, the image buffer 103, the tracking part 104, an integration part 305, and a reverse tracking part 307. Herein, the detection part 102, the image buffer 103, and the tracking part 104 are identical to those of the first embodiment; hence, the descriptions thereof will be omitted here.

The reverse tracking part 307 is configured to carry out a reverse tracking process, which is reverse to the tracking process of the tracking part 104, in an order from a new image to an old image over time based on the detection result of the detection part 102. In addition, the reverse tracking part 307 may establish an association between its reverse-tracking result and the tracking result of the tracking part 104. At this time, a group of images designated by image identifiers may encompass a range of images sandwiched between a latest image for which its detection result has been obtained at a current timing and an image for which a previous detection result has been obtained at a previous timing. For the sake of explanation, the third embodiment separately describes the tracking part 104 and the reverse tracking part 307, but it is possible to realize the tracking part 104 and the reverse tracking part 307 using the same circuitry or the same processing functionality. For example, the tracking part 104 may firstly carry out a tracking process in chronological order, and then the reverse tracking part 307 may carry out a tracking process in reverse chronological order.

The control part 301 is configured to control operations with respect to the detection part 102, the image buffer 103, the tracking part 104, and the reverse tracking part 307.

Figure 15:
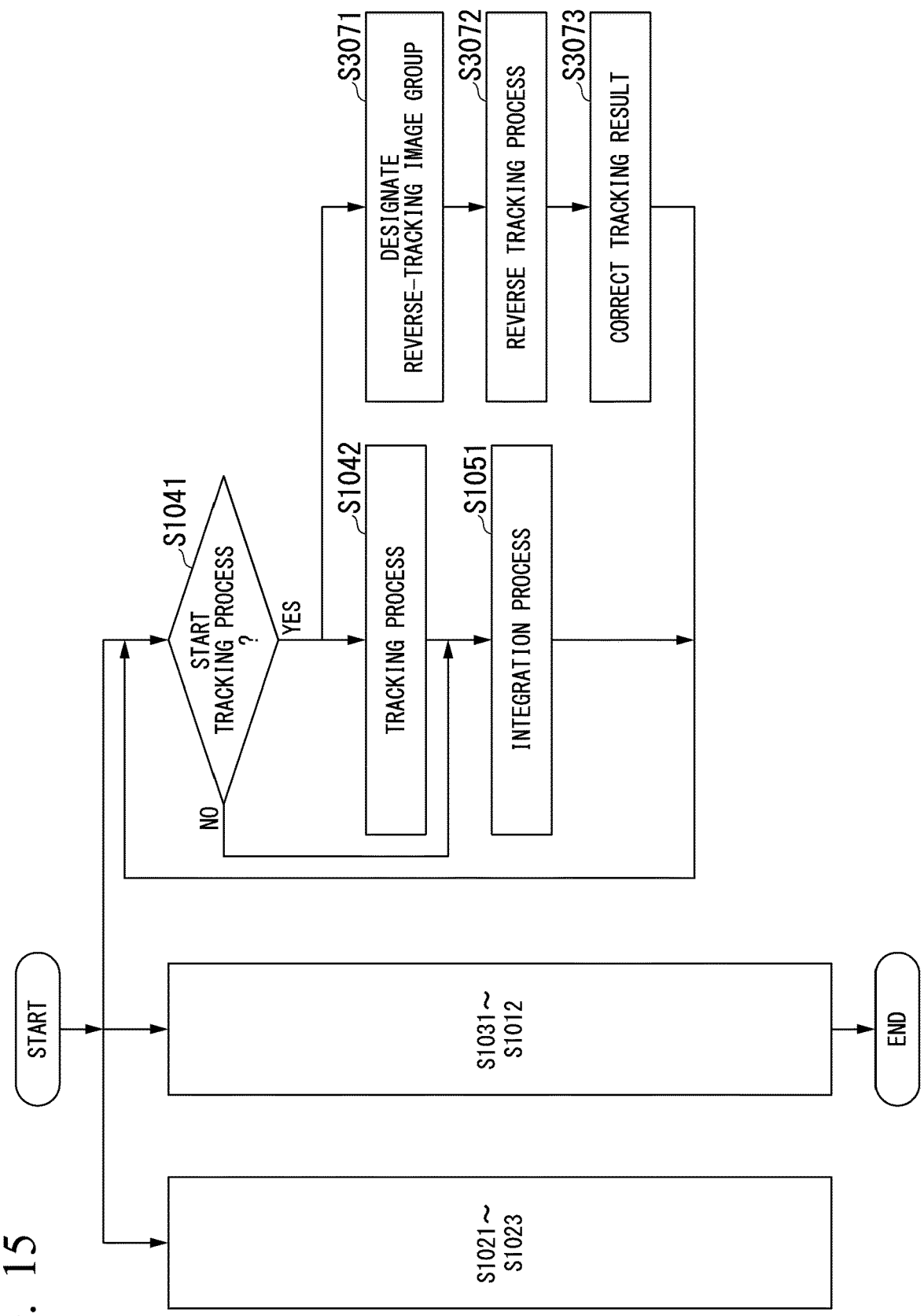
FIG. 15 is a flowchart showing an overall process of the object tracking device according to the third embodiment of the present invention.

FIG. 15 shows the overall process of the object tracking device 100 according to the third embodiment. Compared with the overall process of the first embodiment (see FIG. 2), the overall process of the third embodiment includes the same steps S1021 through S1023, S1031 through S1034, S1012, S1041 through S1042, and S1051 but additionally includes steps S3071 through S3073. Upon determining the commencement of the tracking process (S1042) (i.e. S1041, "YES"), the object tracking device 100 of the third embodiment may execute a series of processes (S3071 through S3073) relating to the reverse tracking process 307 in addition to the tracking process (S1042).

First, the reverse tracking part 307 may designate a group of images subjected to reverse tracking (hereinafter, referred to as a reverse-tracking image group) (S3071). For example, the reverse tracking part 307 may designate the reverse-tracking image group subjected to reverse tracking (or a reverse-tracking image string) just before processing a tracking image group currently subjected to tracking (or a tracking image string); but this is not a restriction. Next, the reverse tracking part 307 may carry out the reverse tracking process with the reverse-tracking image group (S3072). The reverse tracking process would be identical to the foregoing tracking process (S1042) except for tracking in a reverse chronological order, however, it is possible to carry out a different tracking process. Subsequently, a previous tracking result will be corrected based on the result of the reverse tracking process (S3073). Specifically, the result of the tracking process should be associated with the result of the reverse tracking process. When the tracking image group and the reverse-tracking image group may share same images (strictly speaking, same results of image detection), it is easy to associate those groups. When the tracking image group and the reverse-tracking image group do not share same images, it is possible to establish association based on the Hungarian method between the object position of an arbitrary image of the tracking image group and the object position of an arbitrary image of the reverse-tracking image group.

The third embodiment of the present invention is able to retroactively carry out a tracking process with respect to a desired image group. When a person may newly appear in an intermediate image within a tracking image group, the first embodiment may produce tracking results, which is based on detection results, subsequent to images subjected to detection processes executed in chronological order, but the third embodiment is able to obtain tracking results prior to those images in a delayed-time manner.

According to a variation of the third embodiment, it is possible to correct tracking results irrespective of disconnection of tracking results of objects in the halfway of tracking processes due to invisibility of tracking objects hidden by shielding. For example, it is possible to integrate a previous tracking result and a reverse tracking result by way of an association between the previous tracking result and the reverse tracking result according to the Hungarian method using the tracking result which is obtained from an arbitrary image of a tracking image group subjected to tracking for producing tracking results in the past and the tracking result (e.g. an object position) which is obtained from an arbitrary image subjected to reverse tracking (or a common image).

The object tracking devices and their object tracking methods have been described by way of the first embodiment through the third embodiment; but this is not a restriction. For example, it is possible to display a moving trajectory of a person, which is produced by an object tracking device, on the screen of a display device. In addition, it is possible to realize a system configured to track a specific person, who is detected from a video using an object tracking device and displayed on the screen. Moreover, it is possible to store the history of object-tracking results (e.g. object positions (or areas) and object-tracking identifiers) and the history of object-type identifiers and to thereby display those pieces of information on the screen of a display device along with an object tracking device. Alternatively, upon detecting a specific person from a video, it is possible to visually emphasize a specific person on the screen by surrounding its person position (or area) using a rectangular region having a specific color.

In the above embodiments, it is possible for the detection part, the tracking part, and the matching part to control a searching scope of objects with reference to a prescribed processing time (e.g. an upper-limit value of a predetermined processing time for each image). For example, it is possible to reduce an object-searching scope to be smaller than a predetermined scope.

The tracking part may skip the tracking process relating to partial images of a video with reference to a prescribed processing time which is determined by an appropriate method. As described above, it is necessary for the integration part to obtain both the result of a tracking process and the result of a detection process (as well as the result of a matching process) with respect to objects. According to the aforementioned method, it is possible to reduce wait times for various processes and to thereby improve calculation efficiency. As "an appropriate method" described above, for example, it is possible to mention a method of skipping a tracking process when a result of calculation "((a predetermined upper-limit value of a processing time for a single tracking-image string)–(a time required to execute a tracking process for a tracking-image string))/(the number of images whose tracking processes are not skipped within the tracking-image string)" is greater than a predetermined value which is given in advance; but this is not a restriction.

The foregoing embodiments are designed such that a tracking process is started upon generating one tracking-image string just after activation of an object tracking device, but it is possible to start a tracking process upon generating one or a predetermined number of tracking-image strings. That is, it is possible to proceed with a tracking process with respect to a next tracking-image string without waiting even when a processing time for detecting (or matching) objects for a single image becomes temporarily slower than a tracking process for a single tracking-image string. Accordingly, it is possible to produce an effect of reducing a wait time in displaying the result of a tracking process on the screen of a display device.

The foregoing embodiments are designed such that the detection part, the tracking part, and the matching part may extract image features using templates; but this is not a restriction. For example, it is possible to store the calculated image features on a storage in advance, which will be referred to when calculating scores relating to objects.

The object tracking devices of the foregoing embodiments are each designed to include a single detection part and a single matching part, but it is possible to provide multiple sets of detection parts and matching parts to operate concurrently. Accordingly, it is possible to reduce an average processing time in detection processes and matching processes relating to objects, and therefore it is possible to further reduce a time delay in a tracking process for objects.

In the foregoing embodiments, the matching part is configured to carry out a matching process with respect to object positions detected by the detection part, but the matching part may carry out a matching process with respect to object-tracking positions to be tracked by the tracking part. At this time, it is possible to correct object-tracking identifiers using object-type identifiers used by the matching part. In contrast, it is possible to correct object-type identifiers using object-tracking identifiers.

The object tracking device of the present invention may load and execute object-tracking programs in a computer system so as to achieve the detection process, the matching process, the tracking process, and the integration process. Object-tracking programs may be stored in advance on storage devices (e.g. ROM) or storage media (e.g. CD-ROM) and then loaded into a computer system. Alternatively, it is possible to register object-tracking programs with servers or the like, thus downloading programs to a computer system through networks.

Lastly, the present invention is not necessarily limited to the foregoing embodiments and variations; hence, the present invention may embrace various design changes and modifications within a technological scope of the invention as defined in the appended claims.

INDUSTRIAL APPLICABILITY

The present invention relates to a technology of tracking and detecting desired objects (e.g. persons) from videos captured by cameras; but it is possible to contemplate various fields of application. For example, the present invention can be applied to information analysis devices configured to analyze dynamic flows (i.e. flows representing frequencies or moving directions of persons or articles) and moving trajectories of products, clerks, and customers in stores of commercial facilities. In addition, the present invention can be applied to tracking devices configured to track the movement of a non-specified person or the movement of a specific person reflected in videos captured by surveillance cameras installed inside/outside of buildings and houses.

REFERENCE SIGNS LIST 1, 100 object tracking device
101, 201, 301 control part
102 detection part
103 image buffer
104 tracking part
105, 205, 305 integration part
206 matching part
307 reverse tracking part

The invention claimed is:
1. An object tracking device comprising:
   an image buffer configured to store a plurality of images included in a video in a predetermined order;
   a detection part configured to detect a first object position via a detection process with respect to an object reflected an image in the plurality of images;
   a control part configured to store on the image buffer the image successfully detecting the object associated with an image identifier and to designate a tracking-image string including a predetermined number of images defined by a plurality of image identifiers;
   a tracking part configured to track the object in the tracking-image string via a tracking process so as to detect a second object position; and
   an integration part configured to calculate an integrative object position by integrating the first object position of the detection process and the second object position of the tracking process.

2. The object tracking device according to claim 1, further comprising a matching part configured to determine an object type via a matching process using a template having an object-type identifier with respect to the object reflected in the plurality of images, wherein the integration part is configured to produce the integrative object position in association with the object-type identifier.

3. The object tracking device according to claim 1, further comprising a reverse tracking part configured to carry out a reverse tracking process in reverse chronological order conversely to the tracking process for the object reflected in the image in the plurality of images, wherein the tracking result of the tracking process is corrected using a result of the reverse tracking process.

4. The object tracking device according to claim 2, wherein the tracking part is configured to assign an object-tracking identifier to the object, the matching part is configured to assign the object-type identifier to the object, and the integration part is configured to calculate the integrative object position upon associating the object-tracking identifier with the object-type identifier.

5. An object tracking method comprising:
   storing a plurality of images included in a video in a predetermined order on an image buffer;
   detecting a first object position via a detection process with respect to an object reflected in an image in the plurality of images;
   storing on the image buffer the image successfully detecting the object associated with an image identifier;
   designating a tracking-image string including a predetermined number of images defined by a plurality of image identifiers;
   tracking the object in the tracking-image string via a tracking process so as to detect a second object position; and
   calculating an integrative object position by integrating the first object position of the detection process and the second object position of the tracking process.

6. The object tracking method according to claim 5, further comprising:
   determining an object type via a matching process using a template having an object-type identifier with respect to the object reflected in the plurality of images,
   wherein the integrative object position is produced in association with the object-type identifier.

7. The object tracking method according to claim 5, further comprising:

carrying out a reverse tracking process in reverse chronological order conversely to the tracking process of the object reflected in the image in the plurality of images, wherein the tracking result of the tracking process is corrected using a result of the reverse tracking process.

8. A non-transitory computer-readable storage medium having an object tracking program causing a computer to:

store a plurality of images included in a video in a predetermined order on an image buffer;

detect a first object position via a detection process with respect to an object reflected in an image in the plurality of images;

store on the image buffer the image successfully detecting the object associated with an image identifier;

designate a tracking-image string including a predetermined number of images defined by a plurality of image identifiers;

tracking the object in the tracking-image string via a tracking process so as to detect a second object position; and calculating an integrative object position by integrating the first object position of the detection process and the second object position of the tracking process.

9. The non-transitory computer-readable storage medium having an object tracking program according to claim 8, further comprising:

determining an object type via a matching process using a template having an object-type identifier with respect to the object reflected in the plurality of images, wherein the integrative object position is produced in association with the object-type identifier.

10. The non-transitory computer-readable storage medium having an object tracking program according to claim 8, further comprising:

carrying out a reverse tracking process in reverse chronological order conversely to the tracking process of the object reflected in the image in the plurality of images, wherein the tracking result of the tracking process is corrected using a result of the reverse tracking process.

* * * * *